Sept. 16, 1924.
G. W. GRAY ET AL
1,508,451
MANUFACTURE OF ALUMINUM CHLORIDE
Filed Dec. 1, 1921    2 Sheets-Sheet 2
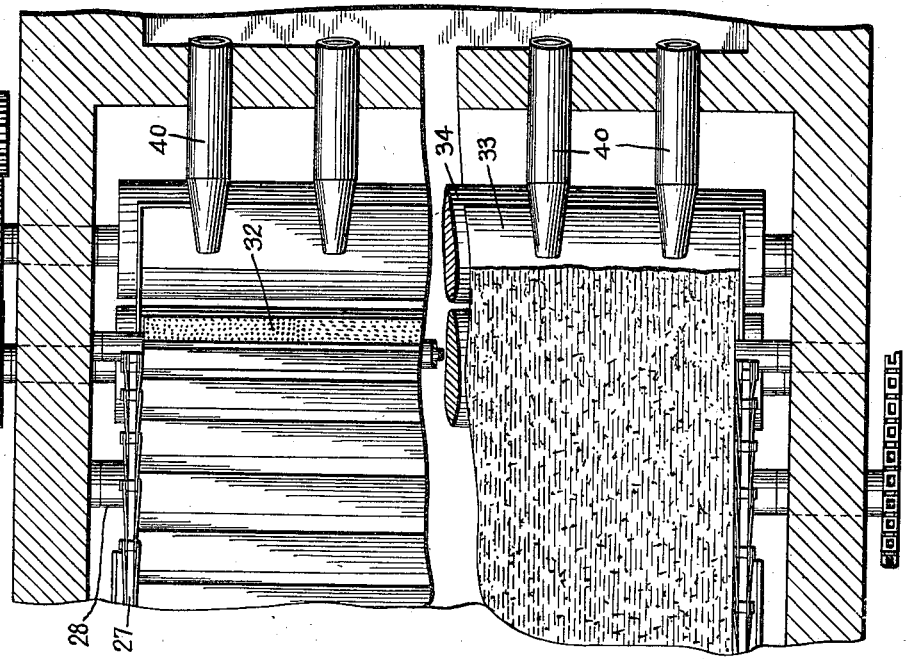
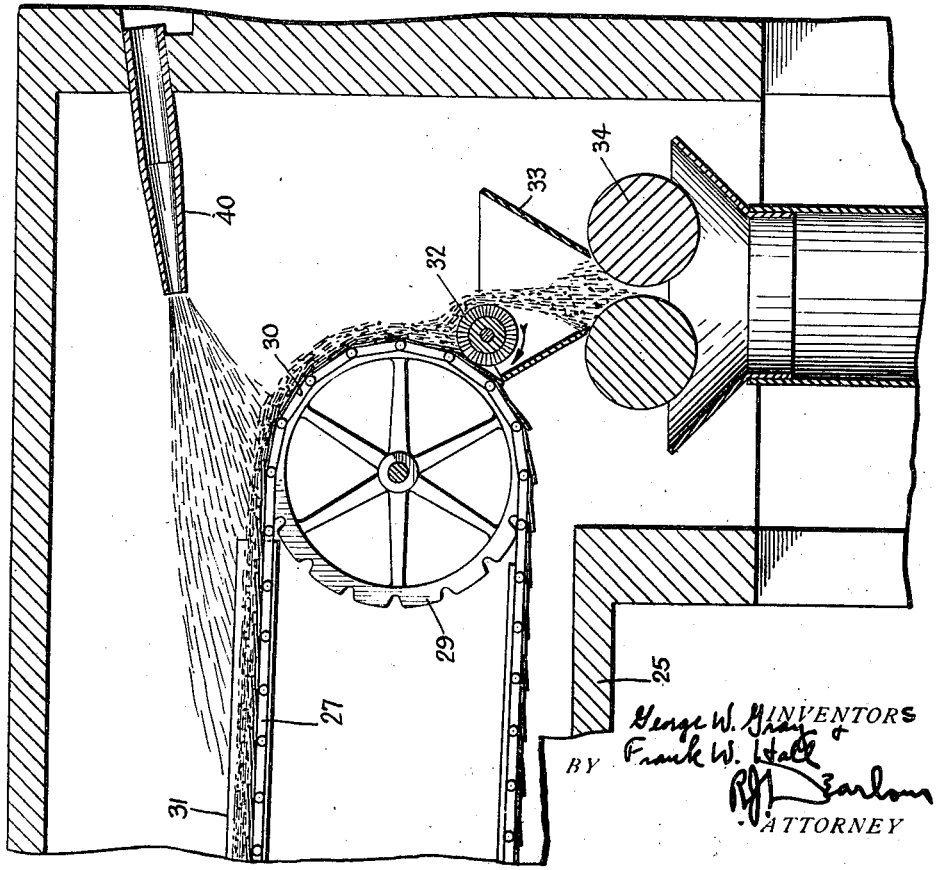
INVENTORS
George W. Gray
Frank W. Hall
BY
ATTORNEY Patented Sept. 16, 1924.

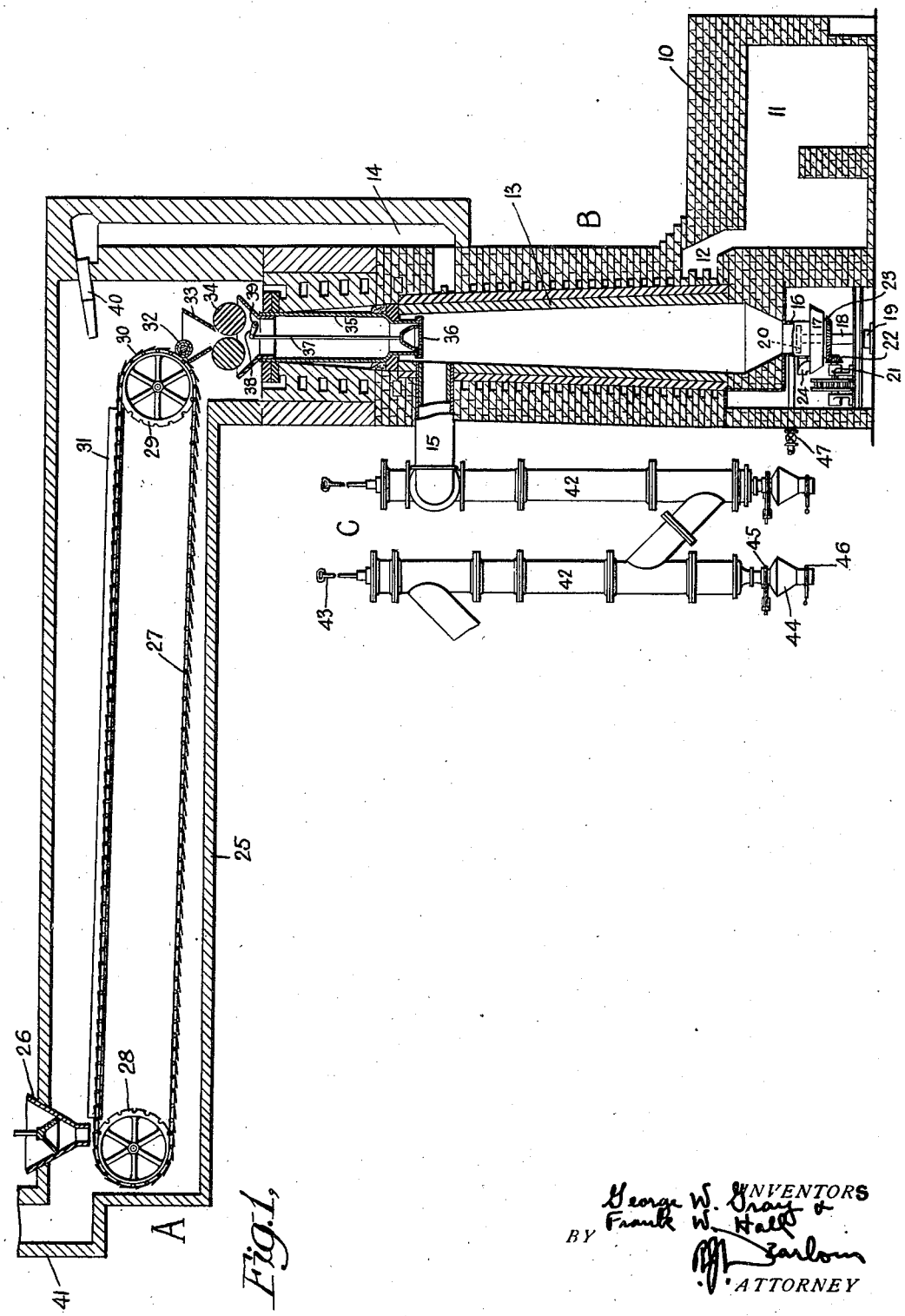

1,508,451

UNITED STATES PATENT OFFICE.

GEORGE W. GRAY, OF NEW YORK, N. Y., AND FRANK W. HALL, OF PORT ARTHUR, TEXAS, ASSIGNORS TO THE TEXAS COMPANY, OF NEW YORK, N. Y., A CORPORATION OF TEXAS.

MANUFACTURE OF ALUMINUM CHLORIDE.

Application filed December 1, 1921. Serial No. 519,08..

To all whom it may concern:

Be it known that we, GEORGE W. GRAY, a citizen of the United States, and a resident of New York, county and State of New York, and FRANK W. HALL, a citizen of the United States, and a resident of Port Arthur, county of Jefferson, and State of Texas, have invented certain new and useful Improvements in the Manufacture of Aluminum Chloride, of which the following is a specification, reference being had to the accompanying drawings, forming a part thereof.

This invention relates to the production of anhydrous aluminum chloride, such as is suitable for use in the treatment of hydrocarbon oils, and has special reference to the production of the chloride in relatively large quantities.

Broadly stated, the invention contemplates the continuous preheating (and coking when necessary) of certain of the materials employed and charging the heated materials into a reaction chamber wherein the conditions are such that aluminum chloride is formed.

One object of our invention is to provide a continuous method of operation by which a mixture of aluminum ore and carbon may be coked and transferred directly into the chlorinating chamber without loss of heat, thereby achieving the advantages of continuity of operation as well as effecting an economy in fuel consumption.

Another object of the invention is to utilize the waste heat from the chlorinating step to supply the heat required for the coking operation and for preheating the alumina-carbon mixture before its admission into the chlorinating chamber.

A still further object is to provide a closed system in which air and moisture are excluded from the materials undergoing treatment during the entire operation, including coking, removal of the coked product to the chlorinating chamber, chlorinating and condensing the aluminum chloride vapors.

In order that our invention may be thoroughly understood, we will now proceed to describe the same in the following specification, reference being had to the accompanying drawings, in which—

Fig. 1 is a sectional elevation of an apparatus constructed in accordance with the invention and constituting an embodiment thereof, Fig. 2 is a section in detail illustrating a portion of the coking apparatus and showing means employed for removing the coked product from the coking chamber, and Fig. 3 is a plan view of the apparatus of Fig. 2.

The apparatus illustrated comprises a coking chamber A, a chlorinating chamber B and a condenser C. The chlorinating apparatus includes a furnace 10, having a combustion chamber 11 from which the hot gases pass through the flue 12 and thence through the checkered brick work around the retort 13 to flue 14. The retort 13 is preferably constructed of suitable refractory material and is provided at the top with a vapor outlet passage 15 through which the aluminum chloride vapors generated in the retort escape into the condenser C.

The retort has at the bottom a cylindrical extension 16 which terminates within a rotary pan 17. The pan is supported by a shaft 18 which is suitably journaled at 19. The shaft 18 preferably extends through the pan 17 and at the upper termination of the shaft a perforated disc or grate 20 is provided. The pan is rotated by means of a shaft 21 and pinion 22 which meshes with a gear wheel 23 on shaft 18. The grate 20 operates to support material in the retort during the chlorination treatment but permits the ash or finer particles to drop into the pan 17. A scraper or plow 24 is arranged to plow the ash in the pan to a predetermined depth so that as the pan rotates the excess ash is discharged therefrom but at the same time sufficient ash remains in the pan to effect a gas-tight seal which serves to prevent the ingress or egress of vapors or gases to or from the retort.

The coking chamber A is arranged to be in communication with the retort 13 and is preferably so positioned that the combustion gases which have been employed to heat the retort 13 may be used to heat the coking chamber.

In the form of apparatus illustrated, the flue 14 is arranged to conduct the hot gases from the furnace 10 and discharge them into an oven or chamber 25 so positioned that the product which is coked therein may be readily transferred into the retort 13. The materials to be coked may be introduced into the oven 25 by means of the hopper 26 which discharges the materials onto a conveyor 27.

In the particular type of apparatus illustrated, the conveyor 27 embodies an endless belt or chain carried by sprocket wheels 28 and 29 located at either end of the oven and one of which is power driven in any suitable manner, as by means of a shaft 48 and gears 49 (shown in Fig. 3). As shown in Fig. 2, the conveyor 27 is made up of a plurality of laterally extending plates 30. The plates are pivotally secured in such manner that when passing around either of the wheels 28, they will be swung on their pivots and thus operate to break up the coked material thereon into relatively small pieces as is clearly indicated in Fig. 2. Guide plates 31 may be positioned on either side of the conveyor to prevent the material from dropping off the conveyor.

Adjacent the wheel 29 at the discharge end of the conveyor 27 is a scraper wheel 32 which is arranged to come into contact with the plates 30 and thus remove the coked material therefrom. The materials thus discharged from the conveyor fall into a chute or hopper 33 by which the coke may be conveyed, if desired, to rollers or crushers 34. It is to be noted, however, that the coked product should not be broken up too finely, owing to the difficulty of passing gas thru a powdered mass, and hence the crushers 34 may ordinarily be omitted, the product as it is removed from the conveyor 27 being usually in pieces of suitable size.

The materials discharged from the conveyor may be transferred to the retort 13 in any convenient manner. In the apparatus shown the coked product, after having passed through the rollers or crushers 34, drops into a hopper 35. At the discharge end of the hopper 35 is a bell valve 36 which is preferably cone shaped and has at the base thereof an annular groove adapted to engage the base of the hopper when the valve is closed. When the materials in the hopper are discharged into the retort some of the finer grained materials will lodge in the groove thereby forming a sealing material so that when the valve is closed by moving it upward a tight closure will be made which will prevent the escape of gases from the retort. The valve is provided with a valve rod 37 adapted to be operated by a lever 38 and a shaft 39 which preferably extends through the walls of the oven 25 so that the valve may be controlled from the outside.

The flue 14 preferably communicates with one or more nozzles 40 which protrude into the coking oven 25 and by which the flue gases may be directed onto the conveyor 27 in order that the heat necessary for coking the alumina-carbon mixture may be supplied thereto. Attention is directed to the fact that a much higher temperature is required in the retort 13 in which the chlorination operation is carried on than in the coking oven 25 which is used for dehydrating and coking the alumina-carbon composition. The combustion gases from the furnace 10, after having been used to supply the heat necessary for chlorination, may thus be employed to provide the heat required for the coking process. It will also be noted that the hopper 35 is so positioned that it may receive heat both from the oven 25 and the furnace 10. The coked materials may thus be transferred to the retort without loss of heat and in fact in such a preheated condition that not only is a heat economy effected but the process is speeded up owing to the decreased time during which it is necessary to hold the coked mixture within the chlorinating chamber. The flue gases after having been utilized to supply heat for the coking operation pass out of the flue or oven 25 through an outlet 41.

The condenser C is constructed in any suitable manner. It may well be composed of a plurality of vertically disposed pipes or cylinders 42 so connected that the aluminum chloride vapors removed from the retort by the vapor outlet 15 may be passed successively through the several cylinders. Each section 42 is preferably equipped with a scraper rod 43 adapted to operate a scraper (not shown) by which the chloride deposited on the walls of the cylinders may be removed therefrom and discharged into hoppers 44 each of which is preferably equipped with an inlet gate 45 and an outlet gate 46 so that the chloride may be discharged from the condenser without interfering with the continuity of the process.

In carrying out the invention the alumina-carbon mixture is prepared by mixing a suitable aluminous material, such as bauxite, aluminum silicate, or other aluminum ore, with a carbon-containing material, such as coal, coke, petroleum or coal-tar residues or pitches, asphalt, acid sludge and the like, and briquetting the mixture, if desired.

It is advantageous to prepare the mixture in a plastic state and the composition may be made in accordance with the process set forth in the application of Frank W. Hall (one of the applicants in the present case) filed on March 1st, 1920, Serial No. 362,198. In the application referred to there is described a process in which a liquid carbon containing material is thoroughly mixed with powdered alumina to form a mixture containing the alumina in suspension thereby producing a very intimate contact between the alumina and carbon. That method of operation may well be used in connection with the present invention, since by the former process a plastic material containing the alumina in suspension may be prepared, and may be readily discharged through the hopper 26 onto the conveyor 27.

The rate of discharge of the materials from the hopper 26 is preferably so controlled that a relatively thin layer is deposited on the conveyor 27. The alumina-carbon mixture is coked in transit, the material introduced at one end of the conveyor being coked by the time it reaches the other end. The layer of coked material is broken up by the action of the pivoted plates 30 and the coke is scraped off the plates and discharged into the retort 13, after such breaking up or crushing as may be necessary or desirable. Chlorin is introduced into the retort through the pipe 47 and the aluminum chloride vapors are continuously removed to the condenser C where they are condensed and collected. The ash resulting from the chlorination treatment is collected in the pan 17 and the excess ash continuously discharged from the pan by means of plow 24.

When using alumina, carbon and chlorin for the production of the aluminum chloride an excess of carbon may, if desired, be put into the alumina-carbon mixture, or fuel may be admitted to the coking oven A with the alumina-carbon compound, and the combustion of this excess carbon compound, and the combustion of this excess carbon or fuel utilized in the coking and preheating operation. Thus when the material is fired, as by means of a hot blast from the nozzles 40, the mixture may readily be coked and preheated. In order to have an efficient ash seal in the ash discharge outlet of the retort it is advantageous to employ a coked product containing an excess of alumina, as is pointed out in the application of Frank W. Hall, Serial No. 365,861, filed March 15th, 1920. The use of an excess of carbon in the charge to the coking oven does not preclude having an excess of alumina in the chlorinating retort since the excess of carbon in the charge to the oven may be so proportioned and the combustion in the oven so regulated that the resultant coked product may contain an excess of alumina over the theoretical proportions required.

Our invention achieves a considerable technical improvement over prior methods of manufacturing aluminum chloride since it involves a particularly advantageous combination of the coking step with the chlorinating step in a single continuous operation, since the coking step itself is carried on continuously rather than intermittently as heretofore, since the coked product is transferred directly from the coking oven to the chlorinating vessel without loss of heat, since the coke is, moreover, in such preheated condition when introduced into the chlorinating vessel that the time required for the chlorination is reduced, since the coke is handled by mechanical means in an efficient manner and in view of other advantages as will readily occur to those skilled in the art.

In describing the invention particular reference has been made to the preparation of aluminum chloride by means of the reaction obtaining between alumina, carbon and chlorin but it is to be understood that other chlorinating agents besides chlorin may be used and that other reactions may be employed. For example, in the practice of the invention aluminum chloride may be formed by the chlorination of aluminum carbid with hydrochloric acid or by treating aluminum oxid with carbon tetrachlorid or phosgen, the solid materials, such as aluminum oxid or carbid, being continuously conveyed to the retort and heated in transit while the chlorinating agent, or fluid containing chlorin, is continuously supplied.

Obviously various modifications of the invention may be made without departing from the spirit and scope thereof. The true scope of the invention is defined in the appended claims.

What is claimed is:

1. The process of making aluminum chloride which comprises supplying a carbon-alumina mixture to a conveyor, heating said mixture while in transit so that the mixture is coked, removing the coked mixture from the conveyor and chlorinating it.

2. The process of making aluminum chloride which comprises supplying a carbon-alumina mixture to a conveyor, heating the mixture while in transit so that the mixture is coked, removing the coked mixture from the conveyor, crushing it into pieces of desired size and contacting the crushed material with chlorin at a temperature sufficient to produce aluminum chloride vapors.

3. The process of making aluminum chloride which comprises supplying a carbon-alumina mixture to a conveyor, heating said mixture while in transit so that the mixture is coked, removing the coked mixture from the conveyor and discharging it into a retort without substantial loss of heat, introducing chlorin into the retort while maintaining therein a temperature sufficient to produce aluminum chloride vapors.

4. The process of making aluminum chloride which comprises introducing chlorin into a retort containing alumina-carbon coke, supplying hot gases to the retort to heat same, removing said gases to a chamber, continuously passing alumina-carbon material through said chamber whereby said material is coked and discharging the resultant coked mixture into the retort to maintain a supply therein.

5. The process of making aluminum chloride which comprises introducing a chlorinating agent into a retort containing alumina-carbon coke, supplying hot gases to the retort to heat same, removing said gases to a chamber, continuously passing alumina-carbon material through said chamber whereby said material is coked, discharging the resulting coked mixture into the retort to maintain a supply therein, continuously removing the ash formed and collecting the aluminum chloride.

6. The process of making aluminum chloride which comprises preparing an alumina-carbon mixture in a plastic state and introducing it onto a conveyor, heating said mixture in transit so that the material is coked, removing the coked mixture from the conveyor and chlorinating it.

7. The process of making aluminum chloride which comprises preparing an alumina-carbon mixture in a plastic state and passing it in a relatively thin layer through a heated chamber whereby the mixture is coked, and then chlorinating the coked mixture.

8. The process of making aluminum chloride which comprises supplying material to be chlorinated to a conveyor, heating said material while in transit so that it is coked, removing the coked mixture from the conveyor and introducing it into a retort, supplying chlorin to the retort and heating the retort sufficiently for chlorination.

9. The process of making aluminum chloride which comprises introducing material for the reaction onto a conveyor, supplying heat to the conveyor whereby the material is heated in transit and discharging said material into a reaction chamber supplied with a chlorinating agent and heated sufficiently to produce aluminum chloride vapors.

10. The process of making aluminum chloride which comprises maintaining materials for the reaction in a retort, applying hot gases to heat said retort, removing said gases to a chamber, continuously passing material for the reaction through said chamber whereby said material is heated in transit, and discharging said material into the retort to maintain a supply therein.

11. The process of making aluminum chloride by means of the reaction obtaining between alumina, carbon and chlorin which comprises preparing a mixture of aluminous material and carbon containing an excess of carbon, heating said mixture so that some of the carbon is consumed and a coked mixture containing an excess of alumina is produced and treating said coked mixture with a chlorinating agent under conditions to form aluminum chloride.

12. The process of making aluminum chloride by means of the reaction obtaining between alumina, carbon and chlorin which comprises preparing a mixture of aluminous material and carbon containing an excess of carbon, heating the mixed product while in transit through a chamber whereby a portion of the carbon is burned and a coked product formed and treating said coked product with a chlorinating agent under conditions to form aluminum chloride.

13. In apparatus for the manufacture of aluminum chloride, a retort, means for admitting chlorin thereto, a heating chamber about said retort, means for supplying heat thereto, an oven adapted to receive material to be coked, a flue arranged to remove gases from the heating chamber and discharge them into said oven, means for transmitting the material to be coked through said oven in contact with the hot gases therein, and means for discharging the resultant coked mixture into the retort.

14. In apparatus for the manufacture of aluminum chloride, a retort, means for admitting chlorin thereto, means for heating the retort, a conveyor for the continuous transmission of material to be coked, means for directing a current of hot gas upon said conveyor whereby said material is coked in transit, and means for removing the coked product from the conveyor and discharging the resultant coked mixture into the retort.

15. In apparatus for the manufacture of aluminum chloride, a coking oven, means for admitting thereto material to be coked, means for transmitting said material through the oven, means for supplying heat to said material while in transit through the oven, a retort arranged to be heated and supplied with a chlorinating agent, means for removing the coked mixture from the oven and charging it into the retort.

16. In apparatus for the manufacture of aluminum chloride, a coking oven, means for admitting thereto material to be coked, means for transmitting said material through the oven, means for supplying heat to said material while in transit through the oven, a retort arranged to be heated and supplied with a chlorinating agent, means for removing the coked product from the oven and charging it into the retort, means for continuously withdrawing spent material from the retort and means for collecting the aluminum chloride.

17. In apparatus for the manufacture of aluminum chloride, a coking oven, means for admitting thereto material to be coked, means for supplying heat to said oven, a retort arranged to be heated and supplied with a chlorinating agent, means positioned in said oven adapted and arranged to crush the coked product thereof and means for transferring the crushed product directly into said retort.

18. In apparatus for the manufacture of aluminum chloride, a coking oven, inlet and outlet hoppers therefor, a conveyor arranged to receive material from the inlet hopper and transmit it to the outlet hopper, means for supplying heat to the oven so that the material admitted to the conveyor is coked in transit, means for removing the coked mixture from the conveyor to the outlet hopper, a retort arranged to be heated and adapted to receive the hot coked mixture from said outlet hopper, means for admitting chlorin to the retort and means for continuously removing from the retort the products of the reaction therein.

In witness whereof I have hereunto set my hand this 16th day of November, 1921.

GEORGE W. GRAY.

In witness whereof I have hereunto set my hand this 23rd day of November, 1921.

FRANK W. HALL.